(12) United States Patent
Leitner (10) Patent No.: US 6,352,295 B1
(45) Date of Patent: Mar. 5, 2002

(54) FUEL DOOR ASSEMBLY

(75) Inventor: Horst Leitner, Laguna Beach, CA (US)

(73) Assignee: American Moto Products, Inc., Irvine, CA (US)

( * ) Notice: Subject to any disclaimer, the term of this patent is extended or adjusted under 35 U.S.C. 154(b) by 0 days.

(21) Appl. No.: 09/556,374

(22) Filed: Apr. 24, 2000

Related U.S. Application Data (60) Provisional application No. 60/131,259, filed on Apr. 27, 1999.

(51) Int. Cl.[7] .............................. B60K 15/05; E05D 7/10
(52) U.S. Cl. ....................... 296/97.22; 16/255; 16/296; 16/303; 16/321
(58) Field of Search ..................... 296/97.22, 146.11; 16/227, 255, 277, 286, 292, 296, 303, 321

(56) References Cited

U.S. PATENT DOCUMENTS

| | | | | |
|---|---|---|---|---|
| 540,707 A | * | 6/1895 | Wolf ............................ 16/296 |
| 1,214,600 A | | 2/1917 | Silverthorne ................ 222/482 |
| 1,930,841 A | | 10/1933 | Miniere ....................... 220/830 |
| 2,067,994 A | | 1/1937 | Thwaits ....................... 220/562 |
| 2,483,947 A | | 10/1949 | Turner ....................... 217/60 C |
| 2,663,447 A | | 12/1953 | Westcott ..................... 220/826 |
| 4,592,529 A | * | 6/1986 | Suzuki .................... 248/475.1 |
| 4,884,317 A | * | 12/1989 | Liu .............................. 16/289 |
| 5,234,122 A | | 8/1993 | Cherng ....................... 220/211 |
| 5,357,376 A | | 10/1994 | Yoshida ....................... 359/844 |
| 5,417,340 A | | 5/1995 | Anthony ..................... 220/830 |
| 5,500,983 A | * | 3/1996 | Lautenschlager ............ 16/304 |
| 5,673,958 A | * | 10/1997 | Gramss .................... 296/97.22 |
| 5,772,062 A | * | 6/1998 | Gramss ....................... 220/829 |
| 6,092,263 A | * | 7/2000 | Boue et al. .................... 16/286 |

OTHER PUBLICATIONS

Photographs of fuel door specimen for Mitsubishi Eclipse being used prior to applicant's invention of claimed fuel door.

* cited by examiner

*Primary Examiner*—Joseph D. Pape
*Assistant Examiner*—Paul Chenevert
(74) *Attorney, Agent, or Firm*—Knobbe Martens Olson &Bear, LLP (57) ABSTRACT

There is described an improved fuel door assembly and methods for assembling same. In one preferred example the fuel door assembly comprises a housing that defines an axis of rotation and has a moveable retaining surface that is biased toward the axis of rotation, and a fuel door received in the housing and rotatable about the axis of rotation between a closed position and an open position. The fuel door has a first cam surface and a second cam surface. The retaining surface contacts the first cam surface and urges the fuel door toward the closed position when the fuel door is at the closed position, and contacts the second cam surface and urges the fuel door toward the open position when the fuel door is at the open position.

10 Claims, 11 Drawing Sheets

FUEL DOOR ASSEMBLY

RELATED APPLICATIONS

This application claims priority from U.S. Provisional Application No. 60/131,259, filed Apr. 27, 1999, titled FUEL DOOR ASSEMBLY.

BACKGROUND OF THE INVENTION

1. Field of the Invention

The present invention relates generally to fuel door systems, and more particularly to a fuel door assembly for a motor vehicle or other equipment fueled by gasoline or other liquid fuels.

2. Description of the Related Art

Many vehicles utilize a fuel door assembly including a fuel door which covers an opening in the body of the vehicle to provide a cosmetically appealing cover over the gas cap. Typically, the fuel door assembly will include a housing, a fuel door and a closing mechanism. The closing mechanism keeps the fuel door closed when the vehicle is not being fueled to minimize any negative impact on the appearance of the vehicle due to the fuel door. Unfortunately, such assemblies are often relatively expensive to manufacture, include numerous parts, and are difficult and time consuming to assemble.

SUMMARY OF THE INVENTION

One aspect of the present invention is an improved fuel door assembly. The assembly includes a housing, a fuel door and a closing mechanism. Advantageously, the assembly is particularly adapted to be inexpensively manufactured out of a minimum of parts, and to be quickly and easily assembled.

In accordance with one preferred embodiment a fuel door assembly comprises a housing that defines an axis of rotation and has a moveable retaining surface that is biased toward the axis of rotation, and a fuel door received in the housing and rotatable about the axis of rotation between a closed position and an open position. The fuel door has a first cam surface and a second cam surface. The retaining surface contacts the first cam surface and urges the fuel door toward the closed position when the fuel door is at the closed position, and contacts the second cam surface and urges the fuel door toward the open position when the fuel door is at the open position.

In accordance with another preferred embodiment a fuel door assembly comprises a housing that has first and second hinge bearings, each of which has an inward-facing open end. The hinge bearings are axially aligned so as to define an axis of rotation. The housing also has a moveable retaining surface that faces the open ends of the first and second hinge bearings and is biased toward the axis of rotation. The fuel door assembly also has a fuel door with a lever portion and first and second axle portions. The fuel door is received in the housing such that the first and second axle portions are journaled to the first and second hinge bearings, the fuel door thus being rotatable about the axis of rotation between a closed position and an open position. The retaining surface retains the fuel door in the housing by contacting and applying a biasing force to the lever portion so as to urge the first and second axle portions against the first and second hinge bearings.

In accordance with yet another preferred embodiment a method of assembling a fuel door to a housing comprises installing first and second axle portions of the fuel door in first and second hinge bearings of the housing, and permitting an outwardly biased retaining surface of the housing to contact a lever portion of the fuel door and thereby urge and retain the first and second axle portions in the first and second hinge bearings.

In accordance with still another preferred embodiment a fuel door assembly comprises a housing that defines an axis of rotation and has a moveable retaining surface that is biased toward the axis of rotation. A fuel door is received in the housing and is rotatable about the axis of rotation between a closed position and an open position. The fuel door has a first cam surface and a second cam surface. The retaining surface contacts one of the first cam surface and the second cam surface to maintain the angular position of the fuel door when the fuel door is in either the open position or the closed position.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Having thus summarized the general nature of the invention and its essential features and advantages, certain preferred embodiments and modifications thereof will become apparent to those skilled in the art from the detailed description herein having reference to the figures that follow, of which.

DETAILED DESCRIPTION OF THE PREFERRED EMBODIMENT

FIGS. 1–5 depict a fuel door assembly 20 having features in accordance with one preferred embodiment of the invention. The fuel door assembly 20 generally comprises a housing 22 that receives a fuel door 24, which is rotatable through about 80°–100° between a closed position A in which the fuel door is generally flush with the housing (see FIG. 3) and an open position B in which the fuel door permits the entry of a nozzle through an opening in the housing (see FIG. 4). Preferably, the angle between the open position and the closed position is about 90°.

The fuel door 24 and the housing 22 are shown in greater detail in FIGS. 5, 6 and 7A–7C. The fuel door 24 has a cover portion 26, a lever portion 28 and axle portions 30a, 30b. The lever portion 28 forms a first cam surface or leverage surface 32a and a second cam surface or leverage surface 32b. A peak surface 34, which is preferably curved, is disposed between the first and second cam surfaces 32a, 32b. To minimize cost and difficulty of assembly, the fuel door 24 is preferably formed or molded as an integral unit; however one skilled in the art will appreciate that any of the cover portion 26, lever portion 28 and axle portions 30a, 30b may be separately fabricated and attached to the remainder of the fuel door 24 via conventional techniques.

Figure 7A:
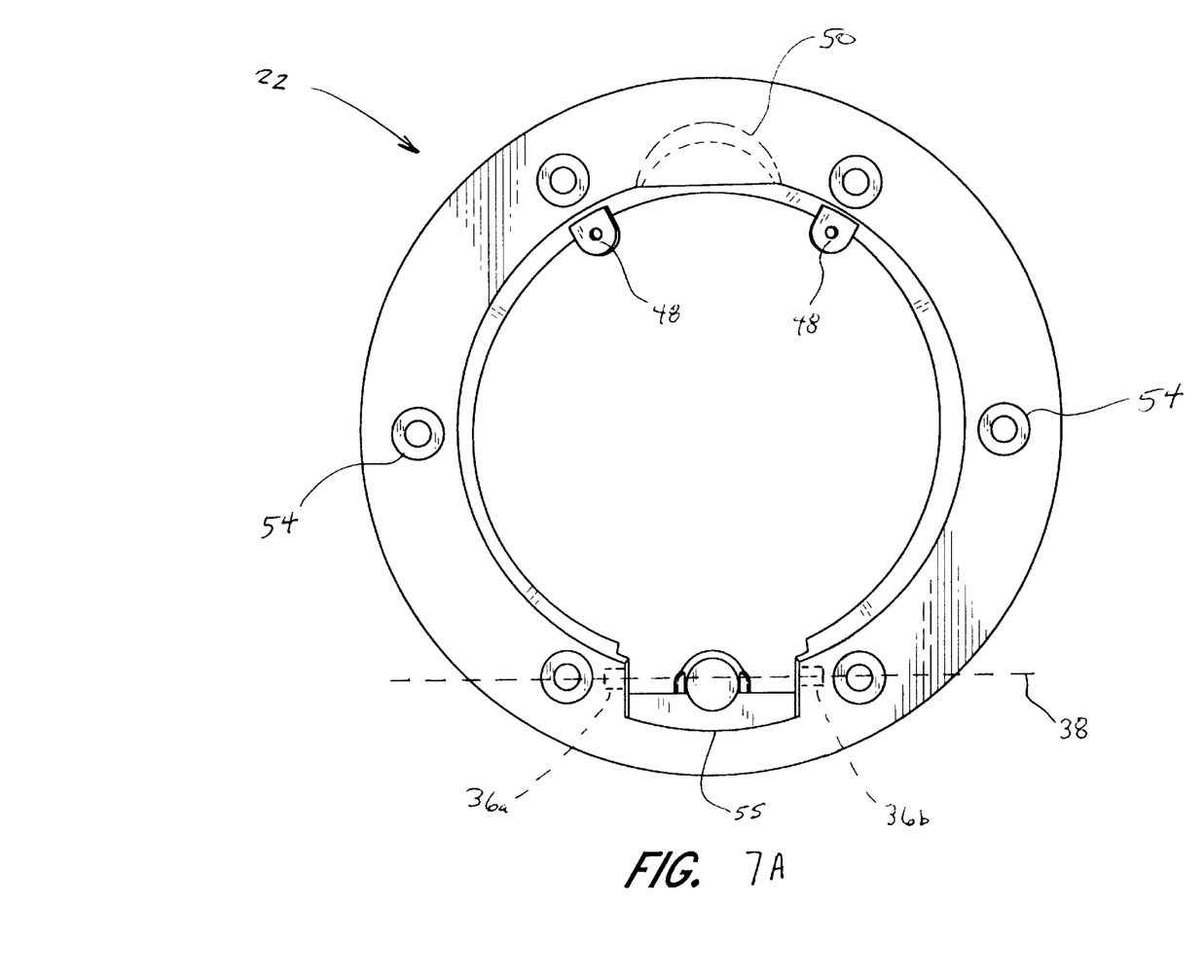
FIGS. 7A–7C are plan, front perspective, and rear perspective views of a housing of the fuel door assembly shown in FIG. 1.
Figure 7B:
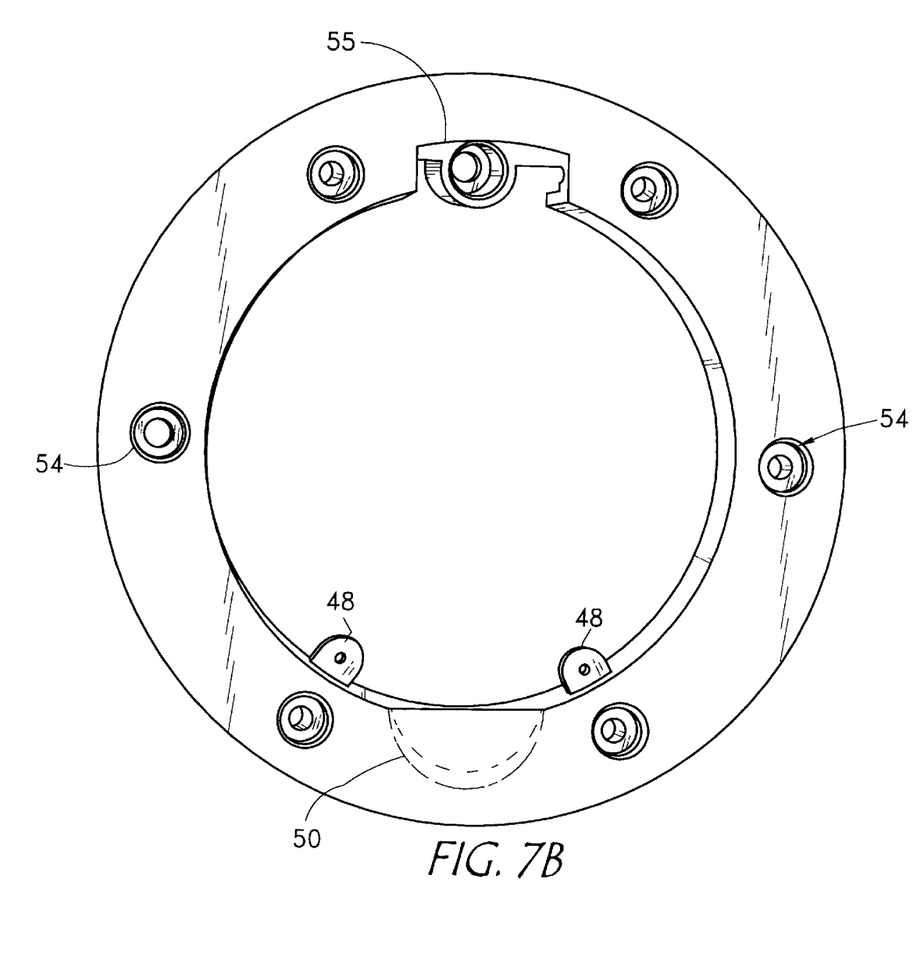
Figure 7C:
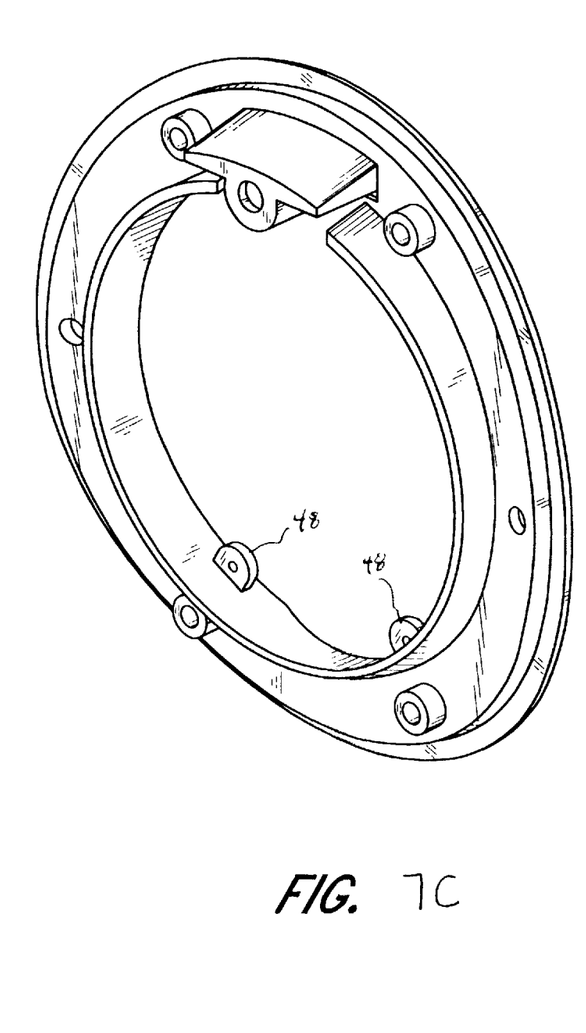

Referring specifically to FIG. 7A, the housing 22 preferably forms a first hinge bearing surface 36a and a second hinge bearing surface 36b that are axially aligned so as to define an axis of rotation 38. In the assembled unit (see FIGS. 3, 4) the hinge bearings 36a, 36b receive the axle portions 30a, 30b to permit the fuel door 24 to rotate about the axis of rotation 38. Although this is the preferred configuration, alternative possibilities exist for rotatably connecting the fuel door 24 to the housing 22, such as a single, extended-width hinge bearing that cooperates with a matching single, extended-width axle formed by the fuel door 24.

Figure 5:
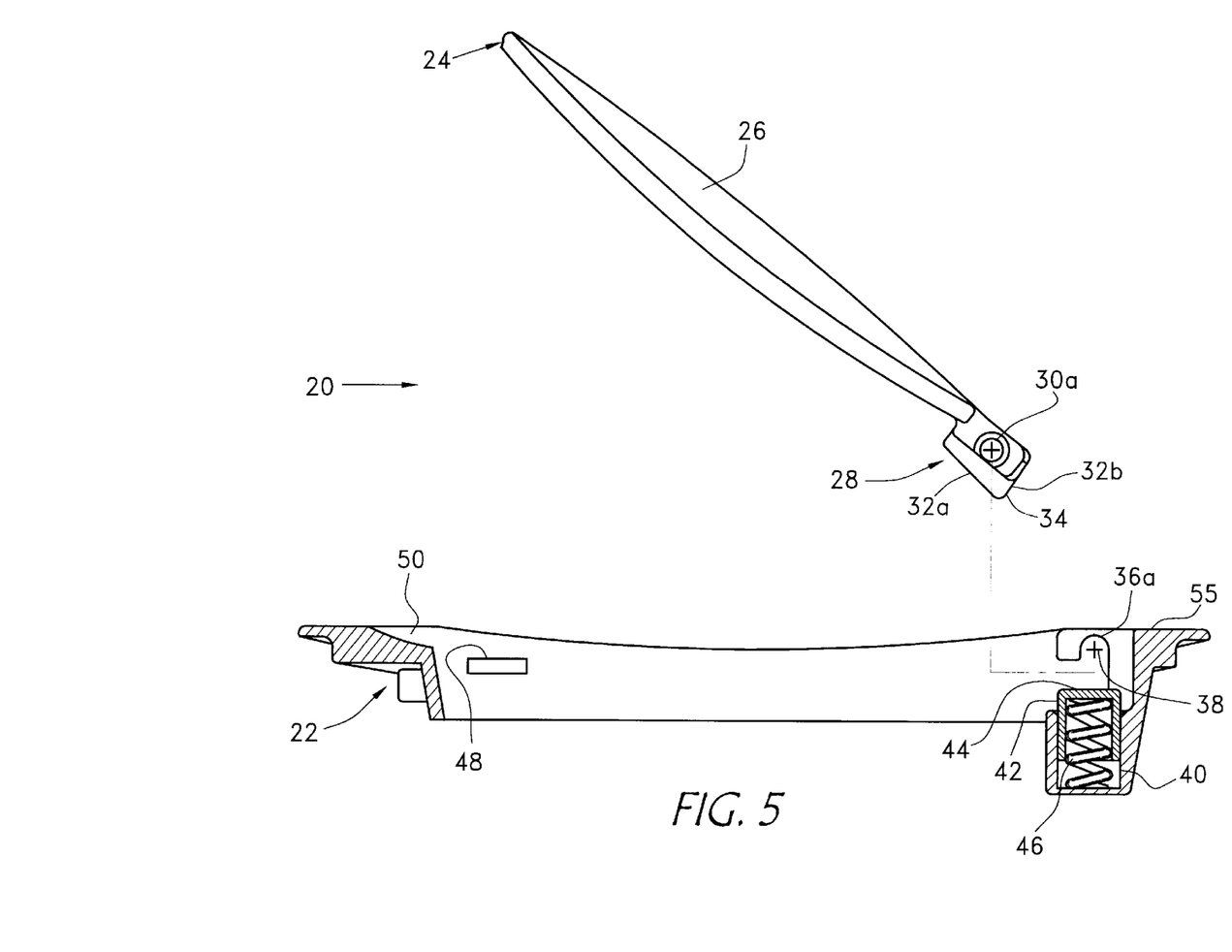
FIG. 5 is an exploded partial sectional view of the fuel door assembly of FIG. 1.
Figure 6:
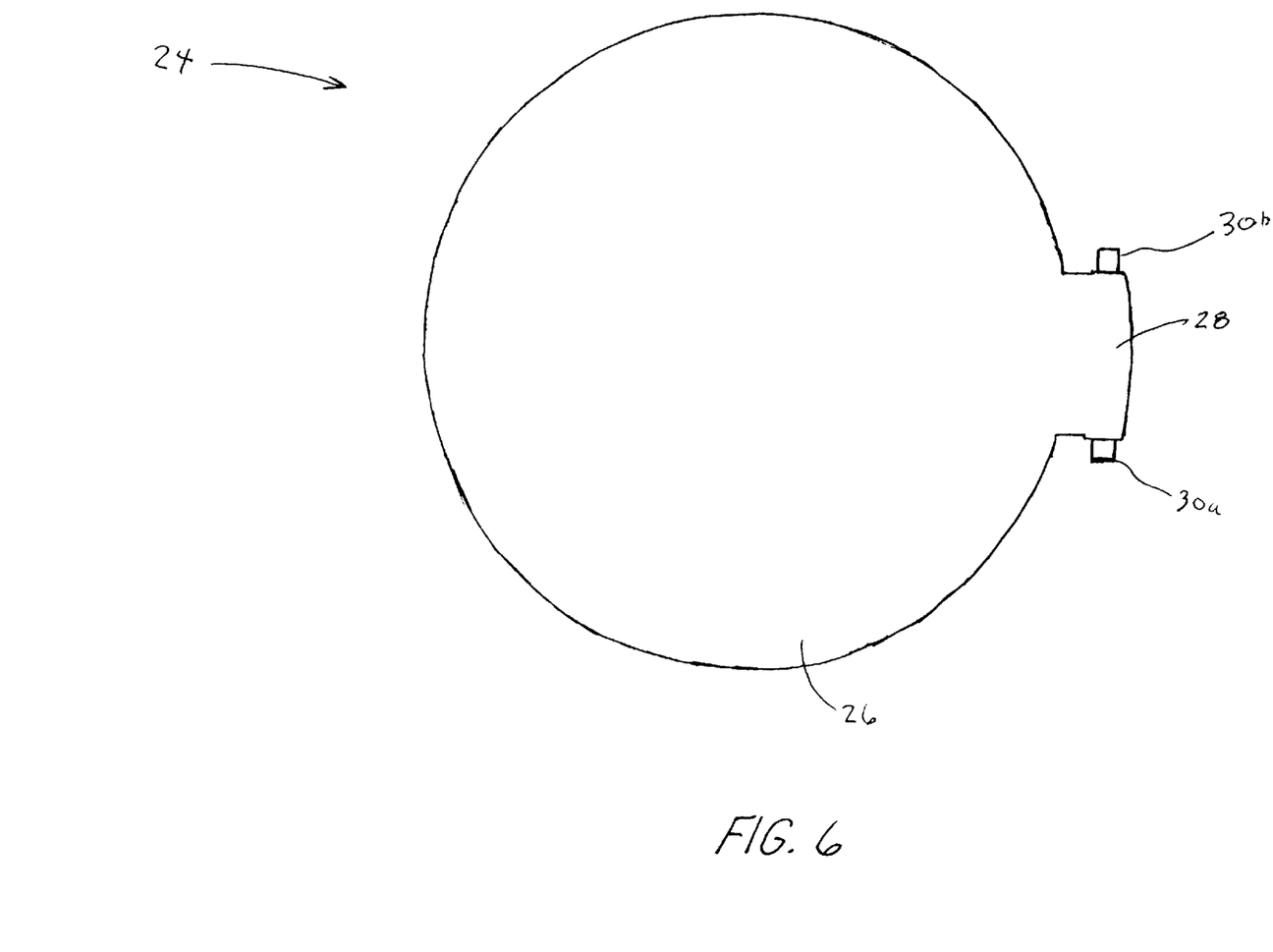
FIG. 6 is a plan view of a fuel door portion of the fuel door assembly shown in FIG. 1.

As best seen in FIG. 5, the hinge bearings 36a, 36b each have an open end that faces inward, i.e. away from the outer side of the housing 22. Inward of the hinge bearings 36a, 36b the housing 22 preferably forms a plunger socket 40 with an outward-facing open end that also faces the inward-facing open ends of the hinge bearings 36a, 36b. The open end of the plunger socket 40 receives a plunger 42 that is moveable linearly in and out of the socket 40. The plunger 42 forms a retaining surface 44 at its outer end surface and has a generally cylindrical inner surface which receives and retains a biasing spring 46. The biasing spring is thus positioned between the bottom of the socket 40 and the top of the plunger 42. The biasing spring 46 biases the plunger 42 and retaining surface 44 in the outward direction, toward the axis of rotation 38. The plunger socket 40, plunger 42 and biasing spring 46 comprise a preferred structure for providing a moveable retaining surface 44 that is biased toward the axis of rotation 38. However, it will be apparent to those skilled in the art that alternative structure may be used, such as an arched or leaf spring with a peak or apex that either serves as the retaining surface 44 or underlies the retaining surface 44, or a V-shaped or angled spring that can likewise serve as the biasing spring only, or both the biasing spring and the retaining surface. Furthermore, the biasing spring 46 and the plunger 42 can comprise a single integrated part. Finally, it is to be appreciated that the housing 22 can be formed as an integral part of motor vehicle/power equipment exterior panel or fueling pipe.

With reference to FIGS. 1, 3–5, and 7A–7C, the housing 22 preferably also comprises one or more alignment pads 48 against which the fuel door 24 rests when in the closed position, and a housing cutout 50 that cooperates with a door cutout 52 in the door 24 to facilitate easy grasping of the distal end of the door 24 when in the closed position. A number of openings 54 may also be provided to allow attachment of the fuel door assembly 20 to a motor vehicle or other equipment, with screws or other fasteners known to those skilled in the art. The housing 22 preferably also forms a mechanical stop 55 to limit the range of travel of the fuel door 24 and more precisely define the open position B.

Figure 1:
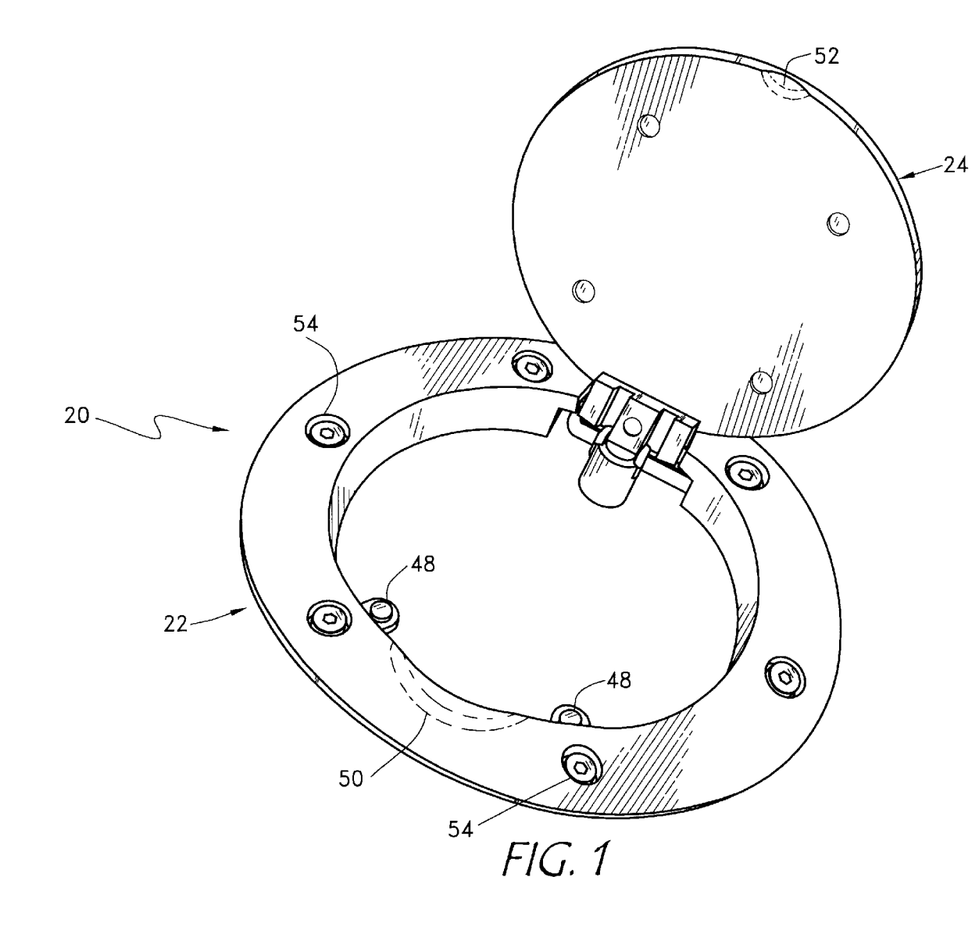
FIG. 1 is a perspective view of a fuel door assembly having features in accordance with one preferred embodiment of the invention, shown with the fuel door in the open position.
Figure 2:
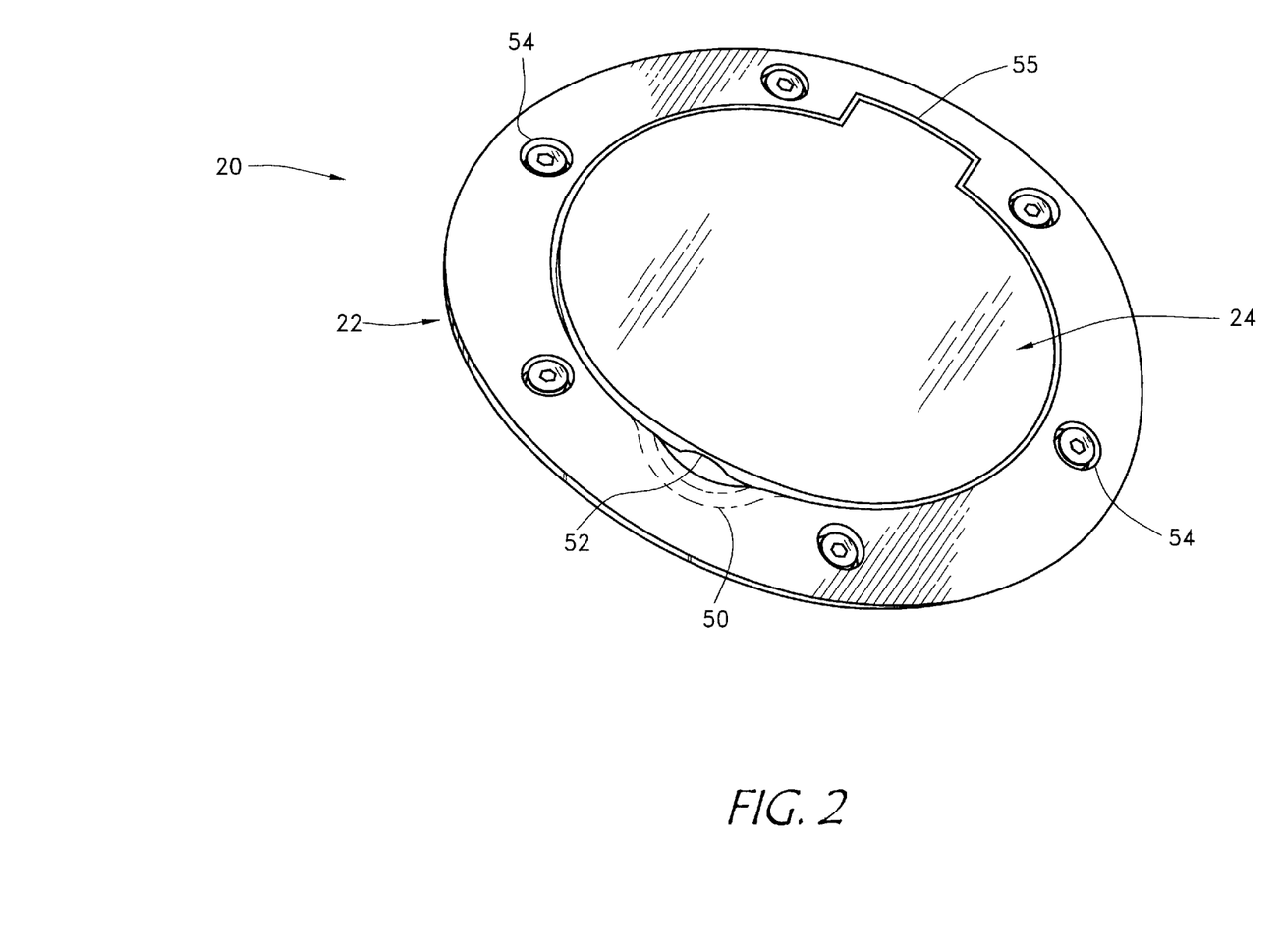
FIG. 2 is a perspective view of the fuel door assembly of FIG. 1, shown with the fuel door in the closed position.
Figure 3:
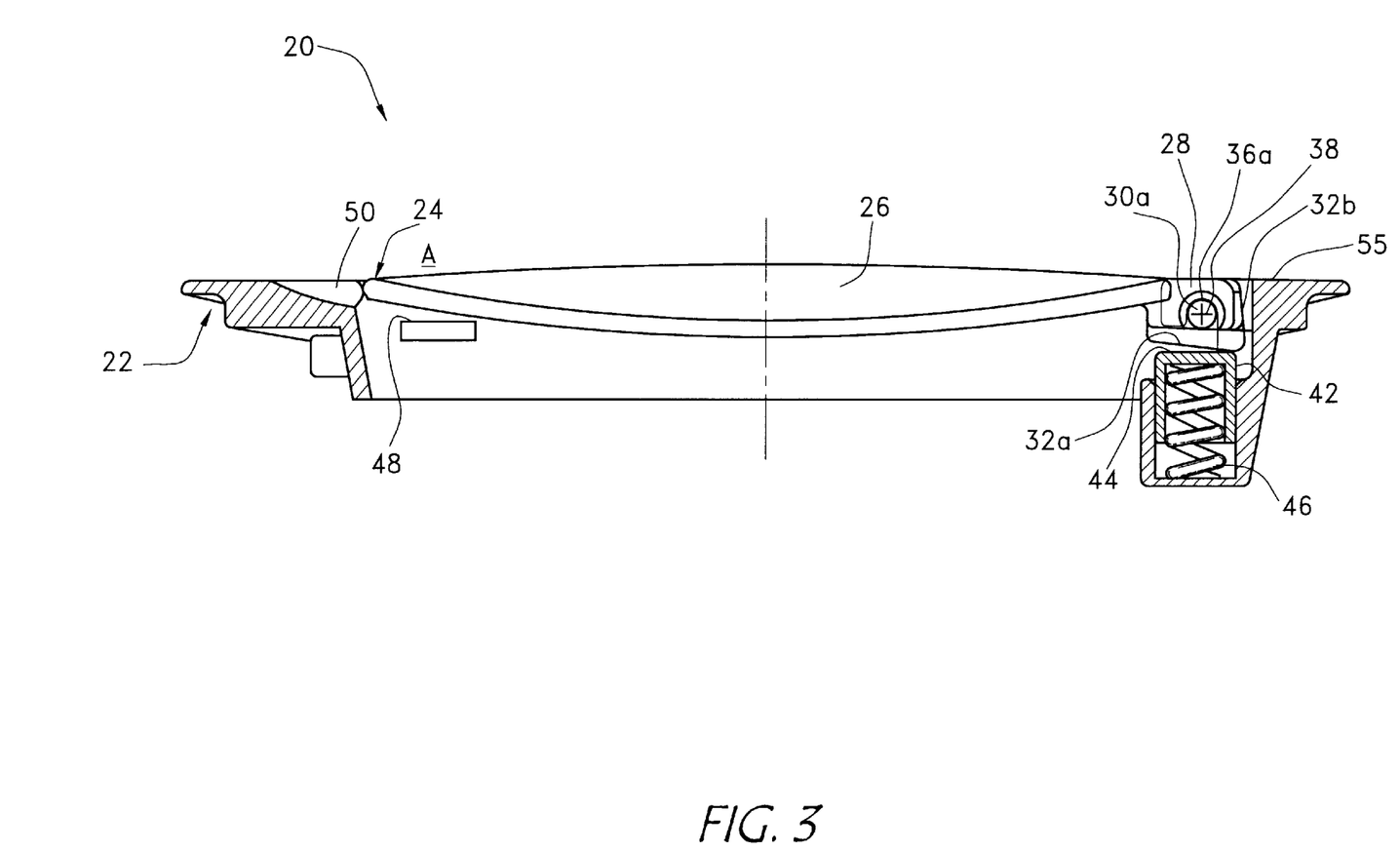
FIG. 3 is a partial sectional view of the fuel door assembly of FIG. 1, shown with the fuel door in the closed position.
Figure 4:
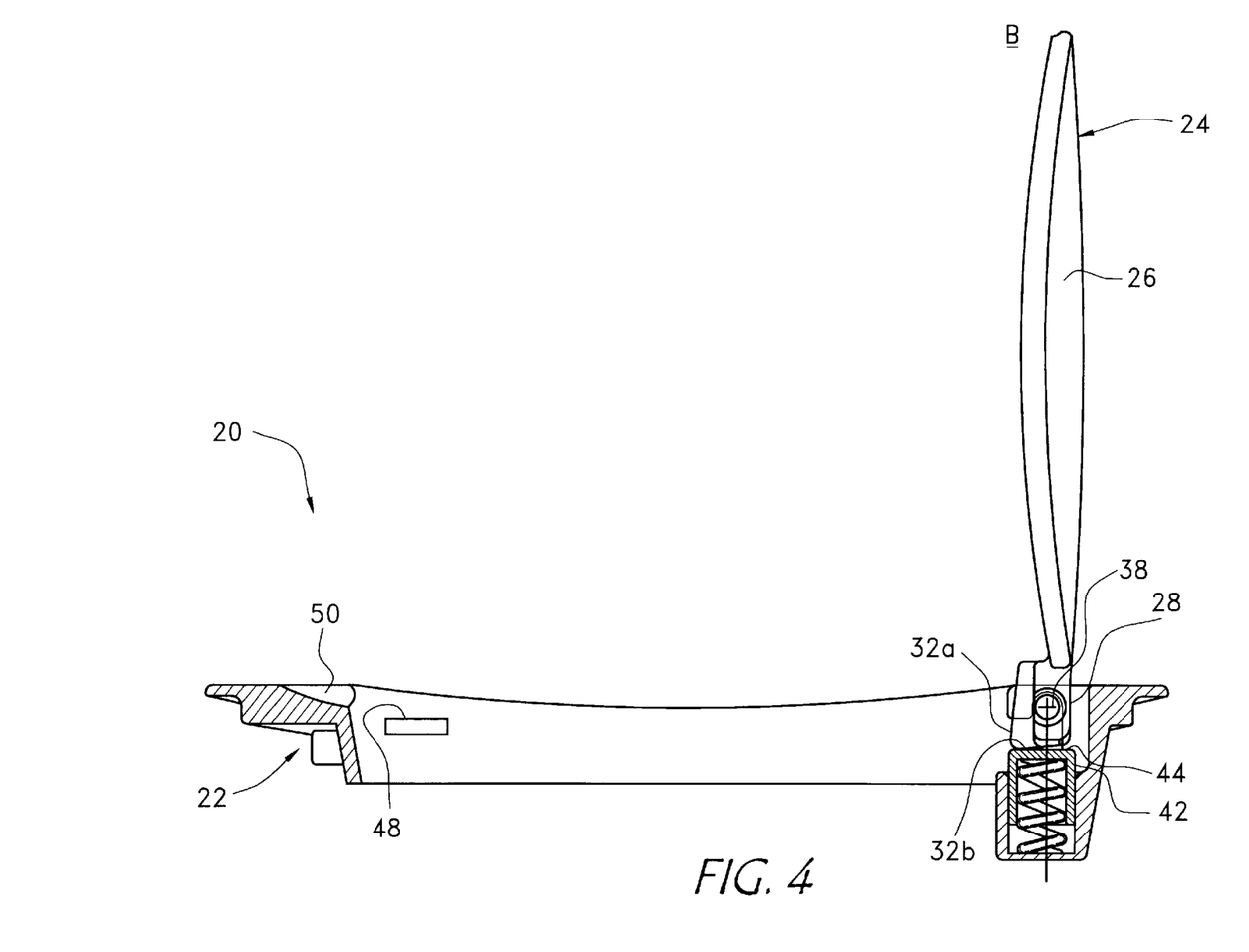
FIG. 4 is a partial sectional view of the fuel door assembly of FIG. 1, shown with the fuel door in the open position.

FIGS. 3 and 4 show the assembled fuel door assembly 20 in detail. When the fuel door 24 is in either the closed position A or the open position B, the retaining surface 44 bears against the lever portion 28 of the fuel door 24 (at either the first cam surface 32a or second cam surface 32b), under the urging of the biasing spring 46. The retaining surface 44 thus retains the fuel door 24 in assembled relation to the housing 22 by urging the first and second axle portions 30a, 30b of the fuel door 24 against the first and second hinge bearings 36a, 36b of the housing 22 and retaining the axle portions therein. In this manner the first and second axle portions 30a, 30b are journaled to the first and second hinge bearings 36a, 36b and the fuel door 24 is fixed to the housing but nonetheless rotatable about the axis of rotation 38.

This arrangement of the retaining surface 44, lever portion 28, axle portions 30a, 30b and hinge bearings 36a, 36b provides many advantages in the construction of the fuel door assembly 20. No tools, fasteners or special skills are needed to assemble the fuel door 24 to the housing 22, which reduces the labor expense incurred in producing the fuel door assembly 22. The preferred assembly 20 contains at most four parts and is thus sturdy, lightweight, reliable, and no more complex than needed. The assembly process is speeded (and labor expenses reduced) when there are fewer parts that need to be put together, and the logistical "tail" leading to the assembly workstation is greatly simplified when fewer parts need to be supplied, tracked and accounted for.

At the closed position A shown in FIG. 3, the retaining surface 44 contacts and bears against the first cam surface 32a and forms an angle such that the retaining surface 44 is not flush with the first cam surface 32a, preferably at a point or region of the cam surface located on a side of the axis of rotation 38 opposite the cover portion 26 of the fuel door 24. Thus when the fuel door 24 is at or near the closed position A, the retaining surface 44 urges the fuel door 24 toward the closed position. Similarly, when the fuel door 24 is at or near the open position B as seen in FIG. 4, the retaining surface 44 contacts and bears against the second cam surface 32b, preferably at a point or region located on a side of the axis of rotation 38 opposite the cover portion 26 of the fuel door 24. Thus when the fuel door 24 is at or near the closed position A, the retaining surface 44 urges the fuel door 24 toward the closed position. In this manner a "closedbias" or "open-bias" force is constantly applied to the fuel door 24 at the closed position A and the open position B, respectively, as the retaining surface 44 and the cam surfaces 32a, 32b coact to hold the fuel door closed or open at either position.

This provision of a closed-bias/open-bias force in the closed and/or open positions A, B is advantageous for several reasons. When closed, the fuel door 24 is less likely to fall open except when the user deliberately grasps it and pulls it open. Thus, the fuel door 24 will not open "by itself" or clatter against the housing 22 when encountering vibration and/or aerodynamic forces when the vehicle (or other equipment) is underway. When open, the fuel door 24 is firmly retained at the (precisely defined) open position B and the fuel door assembly 20 thus conveys to the user the "feel" of a precision-crafted product, which is especially important to owners or potential purchasers of high performance or luxury automobiles. The precision of the open position B can be further enhanced by the inclusion in the housing of the mechanical stop 55 mentioned above.

Figure 8:
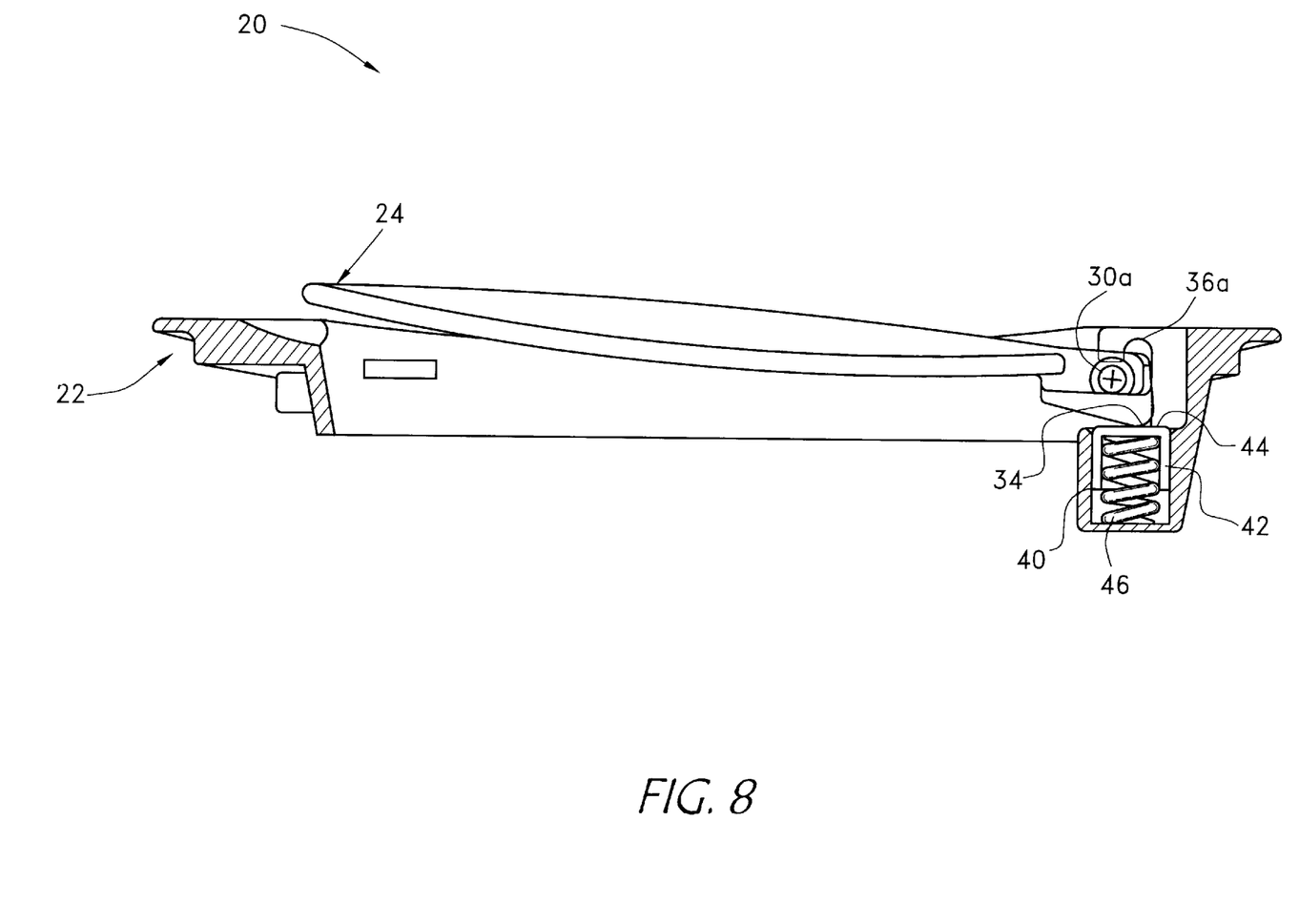
FIG. 8 is a partial sectional view of the fuel door assembly of FIG. 1, shown with the fuel door being assembled to the housing.
Figure 9:
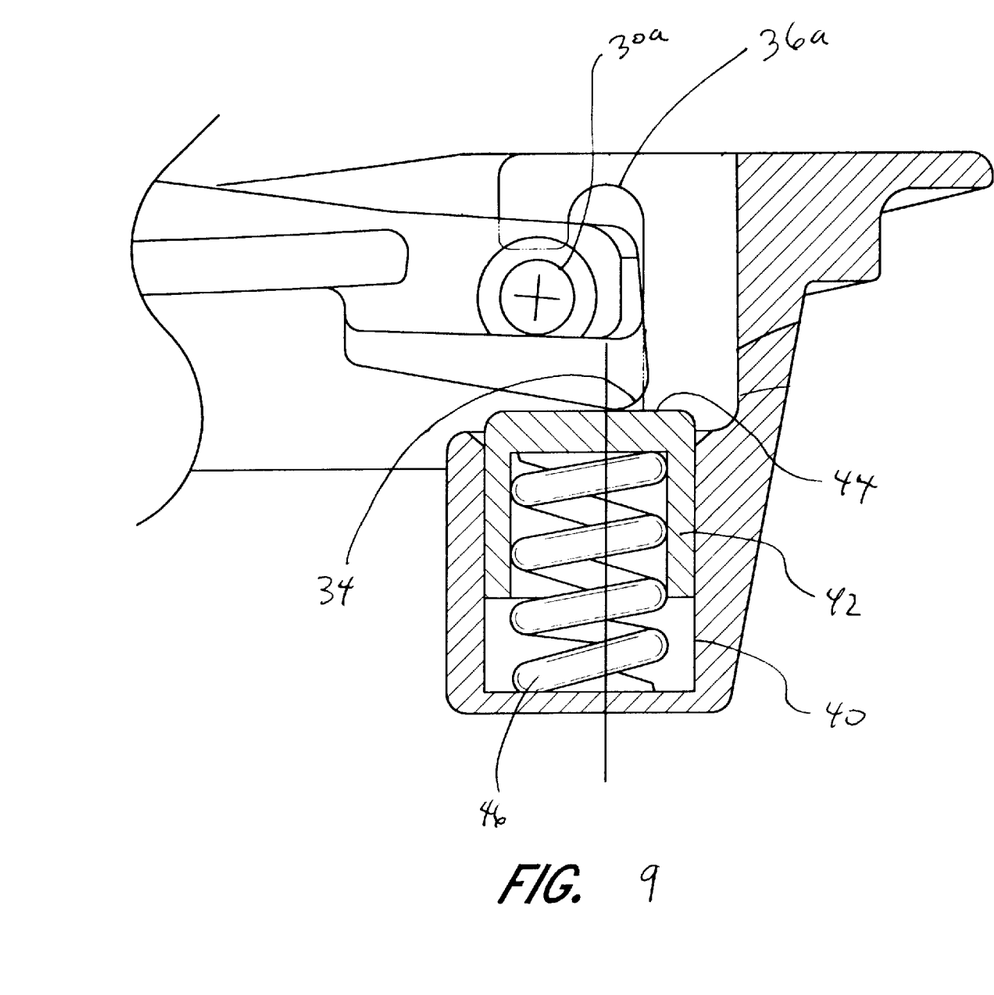
FIG. 9 is an enlarged partial sectional view of the fuel door assembly of FIG. 1, shown with the fuel door being assembled to the housing.

FIGS. 8 and 9 show in greater detail the process of assembling the fuel door 24 to the housing 22. The fuel door is positioned an angle with respect to the closed position A and the peak surface 34 is pressed against the retaining surface 44 of the plunger 42. This forces the plunger 42 downward within the plunger socket 40 until sufficient clearance exists between the plunger 42 and the inward ends of the hinge bearings 36*a*, 36*b* to permit the first and second axle portions 30*a*, 30*b* to be inserted therebetween. Once the axle portions 30*a*, 30*b* and hinge bearings 36*a*, 36*b* are aligned, the outwardly-biased plunger 42 forces the fuel door 24 into its assembled position and maintains the axle portions and hinge bearings in a fixed, but rotatable, relationship.

Thus the fuel door assembly 20 facilitates an assembly process that can be completed without need for tools, fasteners, or highly skilled labor. The small number of parts and the lack of tools or fasteners permits the door installation to be completed quickly and easily. The end result is a sturdy, reliable, and inexpensive fuel door assembly.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A fuel door assembly, comprising:
    a housing, said housing defining an axis of rotation and having a moveable retaining surface that is biased toward said axis of rotation;
    a fuel door received in said housing and rotatable about said axis of rotation between a closed position and an open position, said fuel door having a first cam surface and a second cam surface;
    wherein said retaining surface contacts said first cam surface and forms an angle such that said retaining surface is not flush with said first cam surface when said fuel door is at the closed position, thereby maintaining said fuel door in the closed position, and contacts said second cam surface and urges said fuel door toward the open position when said fuel door is at the open position.

2. The fuel door assembly defined in claim 1, wherein said fuel door assembly comprises three or four parts.

3. The fuel door assembly defined in claim 1, wherein:
    said fuel door further comprises a cover portion attached to said first cam surface and said second cam surface; and
    said retaining surface contacts said first cam surface on a side of said axis of rotation opposite said cover portion when said fuel door is at said closed position, and said retaining surface contacts second cam surface on a side of said axis of rotation opposite said cover portion when said fuel door is at said open position.

4. The fuel door assembly defined in claim 1, wherein said retaining surface and said first cam surface coact to hold said fuel door in the open position, and said retaining surface and said second cam surface coact to hold said fuel door in the closed position.

5. The fuel door assembly defined in claim 1, wherein the distance between said closed position and said open position is about 90°.

6. The fuel door assembly defined in claim 1, wherein said housing further comprises a mechanical stop that limits the range of travel of said fuel door at the open position, said open position being thereby precisely defined.

7. A fuel door assembly, comprising:
    a housing, said housing having:
        an opening to receive said fuel door;
        first and second hinge bearings, each of which has an inward-facing open end, said hinge bearings being axially aligned so as to define an axis of rotation; and
        a moveable retaining surface that faces the open ends of said first and second hinge bearings, said retaining surface being biased toward said axis of rotation;
    said fuel door having a lever portion and first and second axle portions, said fuel door being received in said housing such that said first and second axle portions are journaled to said first and second hinge bearings, said fuel door thus being rotatable about said axis of rotation between a closed position and an open position;
    wherein said retaining surface retains said fuel door in said housing by contacting and applying a biasing force to said lever portion so as to urge said first and second axle portions against said first and second hinge bearings; and
    a plunger having an outer end surface and an inner end;
    wherein said retaining surface is located on said outer end surface; and
    wherein said housing further comprises a plunger socket having an outward-facing open end that faces the inward-facing open ends of said first and second hinge bearings; said plunger socket positioned behind said fuel door when said fuel door is in said closed position; said plunger being received in said open end of said plunger socket and situated on a biasing spring located in said plunger socket that biases said plunger and said retaining surface toward said hinge bearings.

8. The fuel door assembly defined in claim 7, wherein:
    said lever portion comprises first and second leverage surfaces; and
    said retaining surface contacts said first leverage surface and urges said fuel door toward the closed position when said fuel door is at or near the closed position, and contacts said second leverage surface and urges said fuel door toward the open position when said fuel door is at or near the open position.

9. The fuel door assembly defined in claim 7, wherein said fuel door assembly comprises three or four parts.

10. A fuel door assembly, comprising:
    a housing, said housing defining an axis of rotation and having a moveable retaining surface that is biased toward said axis of rotation;
    a fuel door received in said housing and rotatable about said axis of rotation between a closed position and an open position, said fuel door having a first cam surface and a second cam surface;
wherein said retaining surface contacts and forms an acute angle with respect to one of said first cam surface and said second cam surface to maintain the angular position of said fuel door when said fuel door in either the open position or the closed position.

* * * * *